United States Patent
Iizumi et al.

(10) Patent No.: US 6,867,812 B2
(45) Date of Patent: Mar. 15, 2005

(54) FOCUS ADJUSTMENT MECHANISM FOR A VIDEO OR IMAGE PICKUP APPARATUS

(75) Inventors: Masaomi Iizumi, Yokohama (JP); Toshiharu Aikawa, Yokohama (JP)

(73) Assignee: Matsushita Electric Industrial Co., Ltd. (JP)

(*) Notice: Subject to any disclaimer, the term of this patent is extended or adjusted under 35 U.S.C. 154(b) by 814 days.

(21) Appl. No.: 09/774,062

(22) Filed: Jan. 31, 2001

(65) Prior Publication Data

US 2001/0010557 A1 Aug. 2, 2001

(30) Foreign Application Priority Data

Jan. 31, 2000  (JP) ........................................ 2000-022615

(51) Int. Cl.⁷ ........................ H04N 5/225; H04N 5/232; G03B 17/00
(52) U.S. Cl. ........................ 348/374; 348/345; 348/357; 396/82
(58) Field of Search ................................ 348/335, 374, 348/345, 357; 359/819, 823; 396/82, 83

(56) References Cited

U.S. PATENT DOCUMENTS 5,032,919 A * 7/1991 Randmae .................... 348/345
5,115,267 A * 5/1992 Kondo et al. ............... 396/377
5,333,024 A * 7/1994 Labaziewicz ................ 396/79
5,739,853 A * 4/1998 Takahashi ................... 348/335
5,825,559 A * 10/1998 Johnson et al. ............. 359/819
6,351,288 B1 * 2/2002 Johnson et al. ............. 348/373

FOREIGN PATENT DOCUMENTS

JP    2-111175    4/1990

* cited by examiner

Primary Examiner—Andrew Christensen
Assistant Examiner—Lin Ye
(74) Attorney, Agent, or Firm—Parkhurst & Wendel, L.L.P.

(57) ABSTRACT

A rail groove is provided on an outer peripheral portion of a focus adjusting ring. A lens seat, supporting an image pickup lens, is attached to an escutcheon forming a main body. A plurality of engaging protrusions, provided on a front surface of the escutcheon around the lens seat, engage with the rail groove. Cam surfaces, formed on the focus adjusting ring, are brought into contact with protrusions of a bracket which mounts an imaging element. The rotational motion of the focus adjusting ring is converted into a linear or progressive motion of a bracket by the cam surfaces.

2 Claims, 9 Drawing Sheets

FOCUS ADJUSTMENT MECHANISM FOR A VIDEO OR IMAGE PICKUP APPARATUS

BACKGROUND OF THE INVENTION

The present invention relates to a focus adjustment mechanism for a video or image pickup apparatus preferably applicable to a televison camera, a video camera, a digital camera or the like, in which the focus adjustment is performed by changing an optic-axial distance between an imaging element and an image pickup lens.

Figure 8:
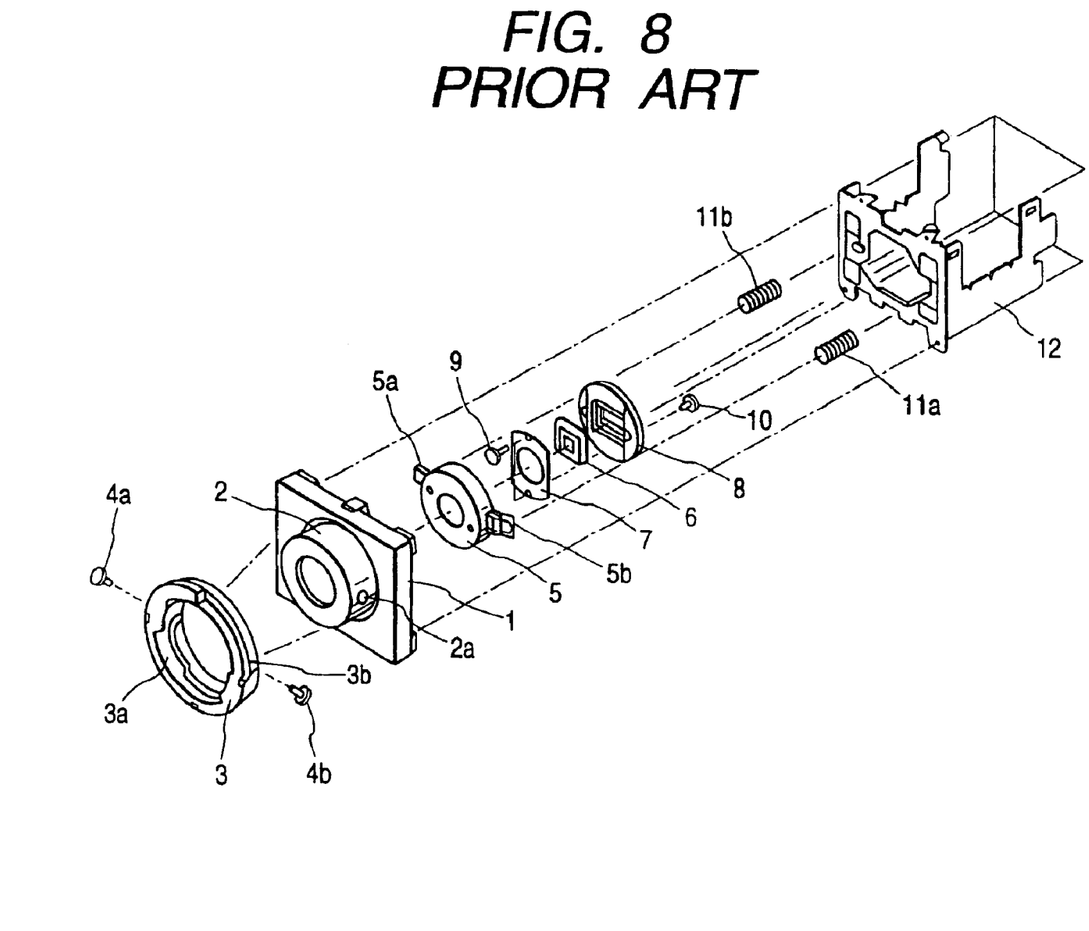
FIG. 8 is a disassembled perspective view showing a conventional video or image pickup apparatus.
Figure 9:
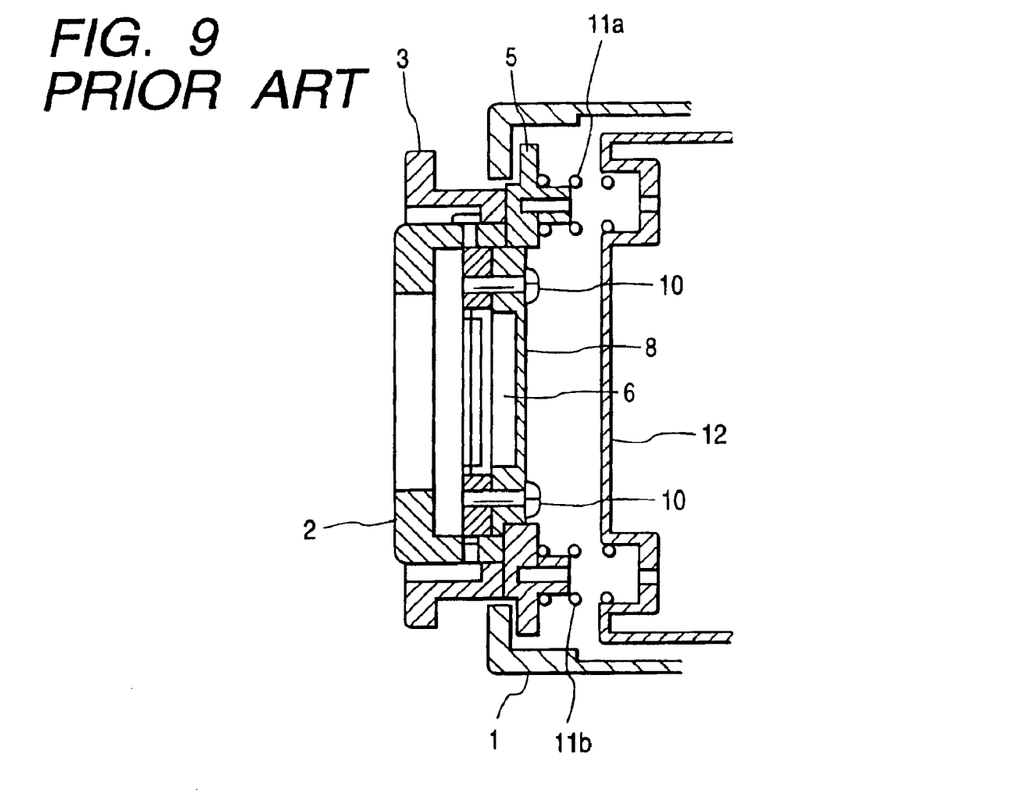
FIG. 9 is a side cross-sectional view showing the conventional video or image pickup apparatus.
Figure 10:
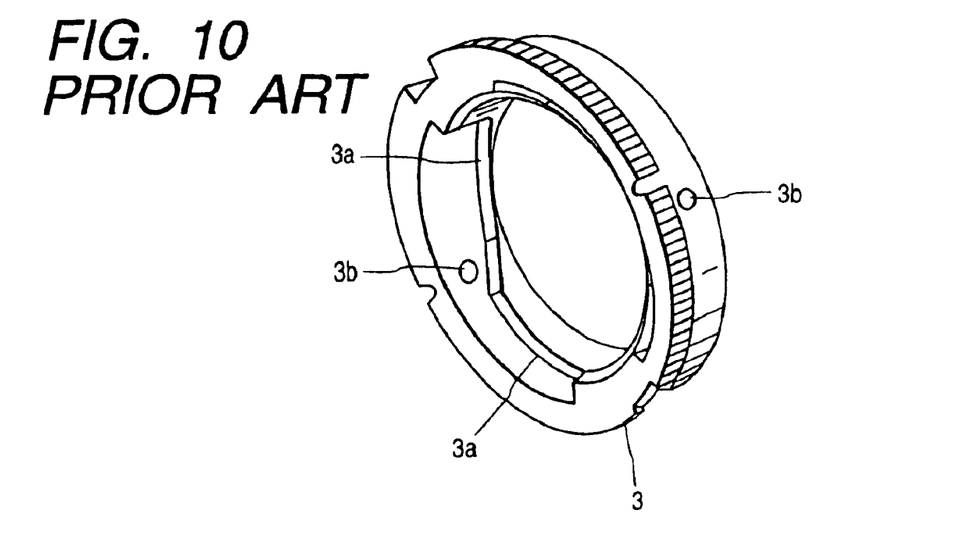
FIG. 10 is a perspective view showing a focus adjusting ring of the conventional video or image pickup apparatus.

For example, Japanese Patent No. 7-8021 discloses a conventional focus adjustment mechanism for a video or image pickup apparatus as shown in FIGS. 8 to 10.

An escutcheon 1 constitutes part of a frame of a televison camera. A lens seat 2, mounting a video of image pickup lens (not shown), is provided on a front surface of the escutcheon 1. A focus adjusting ring 3 is rotatably coupled around the outer peripheral portion of the lens seat 2. As shown in FIG. 10, the focus adjusting ring 3 has a cam surface 3a formed on an inner cylindrical surface thereof. The cam surface 3a extends in the circumferential direction while its slope approaches toward the lens seat 2 in the axial direction.

The focus adjusting ring 3 has a pair of holes 3b into which bolts 4a and 4b are inserted. The lens seat 2 has a pair of screw holes 2a opened on a cylindrical portion thereof. When assembled, the focus adjusting ring 3 is overlapped with the lens seat 2 so that the holes 3b of the focus adjusting ring 3 meet the holes 2a of the lens seat 2. Next, the bolts 4a and 4b are inserted through the holes 3b and fixedly engaged with the screw holes 2a.

After the focus adjusting ring 3 is mounted on the lens seat 2, the focus adjusting ring 3 is rotated relative to the lens seat 2 so that the cum surface 3a of the focus adjusting ring 3 rotates in the circumferential direction while keeping contact with the bolts 4a and 4b securely fixed to the lens seat 2. Thus, the focus adjusting ring 3 advances or retracts in the axial direction with respect to the lens seat 2. In other words, the focus adjusting ring 3 shifts in the protruding direction of the lens seat 2 (i.e., in an optic-axial direction of the image pickup lens).

A bracket 5 is attached to a back surface of the escutcheon 1. The bracket 5 supports a charge coupled device (hereinafter referred to CCD) 6 which is sandwiched between a pressing plate 7 having an aperture opened at the center thereof and another pressing plate 8.

More specifically, the pressing plate 7 is fixed to the pressing plate 8 by means of a bolt 9 so that CCD 6 is exposed from the aperture of the pressing plate 7. Then, the pressing plate 8 is fixed to the bracket 5 by means of a bolt 10. Thus, CCD 6 is securely supported by the bracket 5.

Furthermore, the bracket 5 has a pair of ligulate members 5a and 5b each protruding from an outer cylindrical portion of the bracket 5. A pair of coil springs 11a and 11b contact with the ligulate members 5a and 5b at their axial ends. The coil springs 11a and 11b are pushed at the other axial ends by a chassis 12 constituting part of a main frame. The coil springs 11a and 11b are held in a compressed condition between the chassis 12 and the ligulate members 5a and 5b so that the bracket 5 is resiliently urged toward the escutcheon 1.

Furthermore, the escutcheon 1 has a guide rail (not shown) formed on the back surface thereof. The guide rail extends in the axial direction of the escutcheon 1. The bracket 5 has a protrusion on the outer cylindrical portion. The protrusion of the bracket 5 is shiftable along the guide rail extending in the axial direction of the escutcheon 1. Thus, the bracket 5 shifts with respect to the focus adjusting ring 3 only in the optic-axial direction of the image pickup lens.

According to the above-described conventional television camera, when the focus adjusting ring 3 rotates in one direction, the cam surface 3a moves in the circumferential direction relative to the lens seat 2 while a contact point between the cam surface 3a and each of the bolts 4a and 4b fixed to the lens seat 2 shifts from a deep portion to a shallow portion of the cam surface 3a. Thus, the focus adjusting ring 3 shifts in an axially inward direction relative to the lens seat 2. The bracket 5 departs from the lens seat 2 against the resilient force of the coil springs 11a and 11b. In other words, an optic-axial distance between CCD 6 and the image pickup lens increases.

On the contrary, when the focus adjusting ring 3 rotates in the opposite direction, the cam surface 3a moves in the other circumferential direction relative to the lens seat 2 while the contact point between the cam surface 3a and each of the bolts 4a and 4b fixed to the lens seat 2 shifts from the shallow portion to the deep portion of the cam surface 3a. Thus, the focus adjusting ring 3 shifts in an axially outward direction relative to the lens seat 2. The bracket 5, urged by the coil springs 11a and 11b, approaches toward the lens seat 2. In other words, the optic-axial distance between CCD 6 and the image pickup lens decreases.

In this manner, by rotating the focus adjusting ring 3, the contact point between the cam surface 3a and each of the bolts 4a and 4b can be changed. Thus, the rotational motion of the focus adjusting ring 3 can be converted into a linear or progressive motion of the bracket 5. This makes it possible to vary the optic-axial distance between the image pickup lens and CCD 6 so as to perform the focus adjustment.

However, the above-described conventional focus adjustment mechanism is very complicated in arrangement and its assembling operation is time consuming.

SUMMARY OF THE INVENTION

In view of the foregoing problems, the present invention has an object to provide a focus adjustment mechanism for a video or image pickup apparatus capable of surely engaging the focus adjusting ring with the lens seat and also capable of improving installation of the focus adjustment mechanism as well as installation of the video or image pickup apparatus.

To accomplish the above and other related objects, the present invention provides a focus adjustment mechanism for a video or image pickup apparatus. A main frame is provided. A focus adjusting ring is rotatably engaged with an annular lens seat protruding forward from a front surface of the main frame. The lens seat supports an image pickup lens. An imaging element mount is provided for mounting an imaging element. The imaging element mount is located inside the main frame so as to oppose to the focus adjusting ring. The imaging element mount is shiftable in an optic-axial direction of the image pickup lens in response to rotational motion of the focus adjusting ring. A pressing member presses the imaging element mount toward the focus adjusting ring. A plurality of protrusions are provided on an outer cylindrical portion of the imaging element mount. A rail groove is provided on an outer cylindrical portion of the focus adjusting ring. The rail groove extends in a circumferential direction of the focus adjusting ring. A plurality of engaging protrusions are provided on the front surface of the main frame around the lens seat and are engaged with the rail groove of the focus adjusting ring. And, cam means is provided on the focus adjusting ring so as to oppose to the imaging element mount and contact with the protrusions provided on the outer cylindrical portion of the imaging element mount. The cam means increases a distance between the imaging element mount and the focus adjusting ring against a pressing force of the pressing member when the focus adjusting ring rotates in one direction. Furthermore, the cam means allows the imaging element mount urged by the pressing force of the pressing member approaches toward the focus adjusting ring when the focus adjusting ring rotates in an opposite direction.

With this arrangement, the focus adjusting ring can be easily assembled with the lens seat by engaging the rail groove provided on the outer cylindrical portion of the focus adjusting ring with the engaging protrusions provided on the front surface of the main frame around the lens seat. Furthermore, the cam means of the focus adjusting ring is brought into contact with the protrusions of the imaging element mount to cooperatively convert the rotational motion of the focus adjusting ring into the linear or progressive motion of the imaging element mount. Providing the cam means on the focus adjusting ring so as to oppose to the imaging element mount makes it possible to flexibly change the optic-axial distance between the image pickup lens and the imaging element so as to surely perform the focus adjustment.

Furthermore, according to the present invention, it is preferable that at least one ligulate member protrudes from the outer cylindrical portion of the imaging element mount and is slidable along a rod member provided on the main body when the imaging element mount slides, and the pressing member comprises at least one coil spring disposed around the rod member and at least one pressing plate spring detachably engaged with the main frame and holding the coil spring in a compressed condition so that the the imaging element mount is resiliently urged by the coil spring toward the focus adjusting ring.

According to this arrangement, after inserting the rod member into the insertion hole of the ligulate member, the coil spring is placed around the rod member. Then, the pressing plate spring is fixed to the main frame to hold the coil spring in a compressed condition. Thus, the imaging element mount can be easily installed to the main frame.

Furthermore, according to the present invention, it is preferable that a plurality of notched portions are formed on the outer cylindrical portion of the focus adjusting ring at predetermined intervals in the circumferential direction so as to be continuous with the rail groove. The engaging protrusions are slid into the rail groove via the notched portions and engaged with the rail groove. The focus adjusting ring has a stopper which hits against the protrusions of the imaging element mount so that rotation of the focus adjusting ring is restricted at a predetermined angular position when the focus adjusting ring rotates in the opposite direction. And, the engaging protrusions are angularly offset from the notched portions when the focus adjusting ring is held at the predetermined angular position.

With this arrangement, it becomes possible to easily assemble the focus adjusting ring with the lens seat by engaging the engaging protrusions into the rail groove via the notched portions.

Furthermore, the focus adjusting ring has the stopper. When the focus adjusting ring is in a predetermined angular position, the focus adjusting ring hits the stopper against the protrusions of the imaging element mount so as to restrict the rotation of the focus adjusting ring and prevent the notched portions from meeting with the engaging protrusions of the main frame. Thus, the focus adjusting ring can be easily assembled with the lens seat by pushing and sliding the engaging protrusions into the rail groove via the notched portions. The stopper surely holds the rail groove into an engaged condition with the engaging protrusions. Thus, it becomes possible to prevent the rail groove from being disengaged from the engaging protrusions. The focus adjusting ring can be securely mounted on the lens seat.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF A PREFERRED EMBODIMENT

Hereinafter, a preferred embodiment of the present invention will be explained with reference to the attached drawings. Identical parts are denoted by the same reference numerals throughout the views.

FIGS. 1 to 7 show a video or image pickup apparatus in accordance with a preferred embodiment of the present invention, which is applicable to a television camera, a video camera, a digital camera or the like.

First, an arrangement of the video or image pickup apparatus will be explained with reference to FIGS. 1 through 4. An escutcheon 21 constitutes part of a main frame of the video or image pickup apparatus. An annular lens seat 22 protrudes from a front surface of the escutcheon 21. The lens seat 22 has an opening (or aperture) 22a which supports an image pickup lens (not shown).

Figure 1:
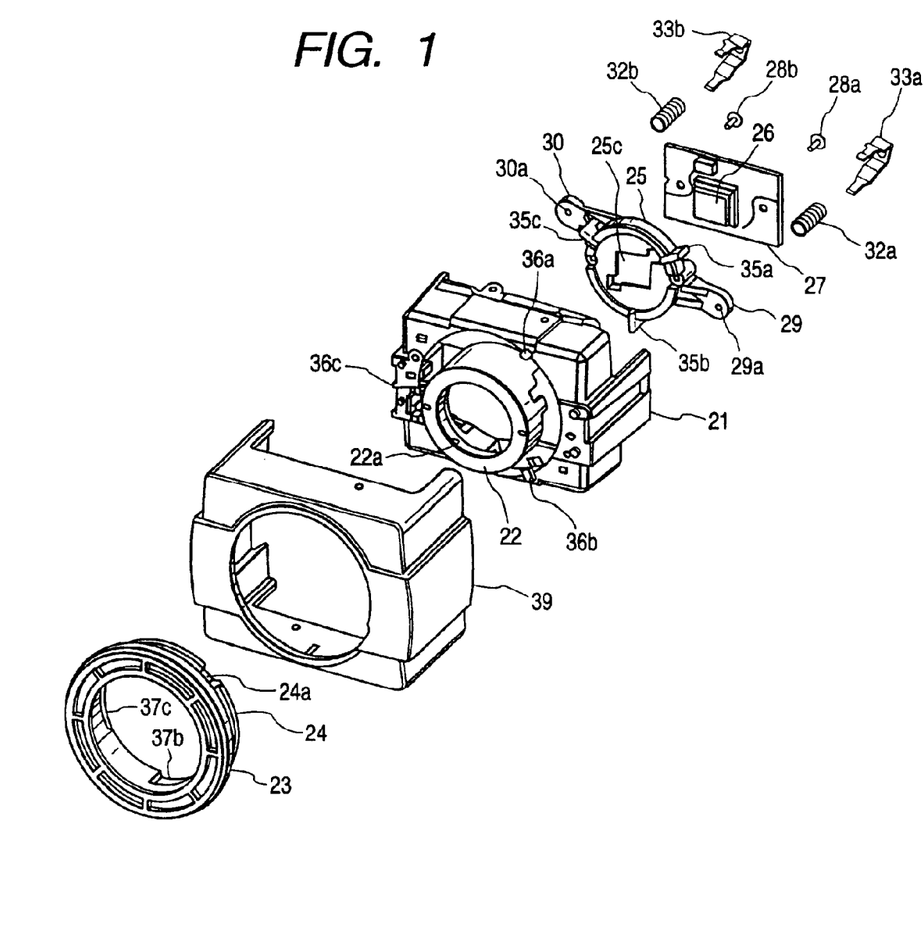
FIG. 1 is a disassembled perspective view showing a video or image pickup apparatus in accordance with a preferred embodiment of the present invention.
Figure 2:
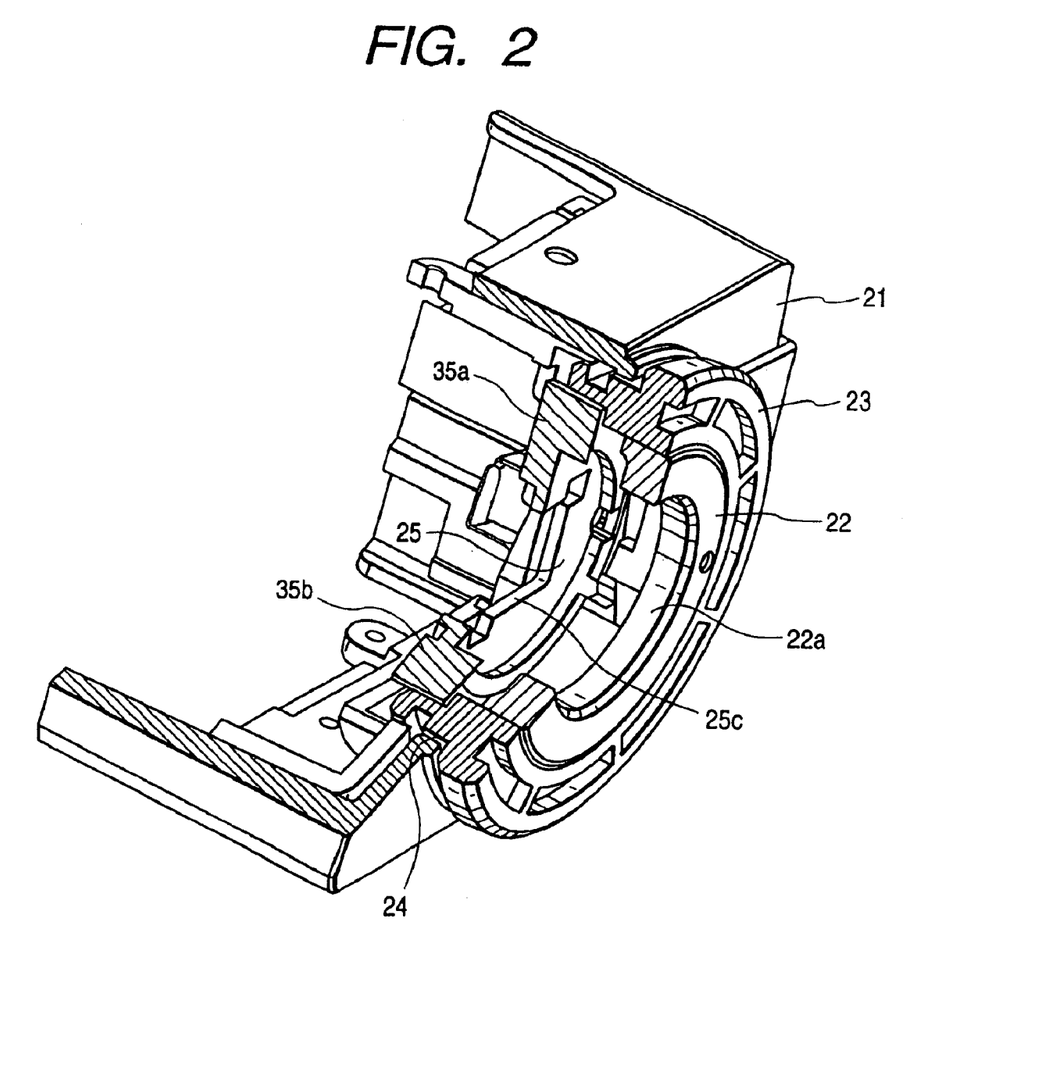
FIG. 2 is a partly cross-sectional perspective view showing a focus adjustment mechanism of the video or image pickup apparatus in accordance with the preferred embodiment of the present invention.

A focus adjusting ring 23 is rotatably coupled around the outer cylindrical portion of the lens seat 22. The focus adjusting ring 23 has an outer cylindrical portion on which a rail groove 24 is formed so as to extend in a circumferential direction. Three notched portions 24a (although only one notched portion is shown in FIG. 1) are formed on the outer cylindrical portion of the focus adjusting ring 23 at predetermined circumferential intervals. Each notched portion 24a extends in the same direction as an axial direction of the lens seat 22 (i.e., in the optic-axial direction of the image pickup lens). Each notched portion 24a is continuous with the rail groove 24.

Furthermore, the escutcheon 21 has an inner cylindrical surface to which a bracket 25 is attached. The bracket 25 serves as a mount which supports an imaging element such as CCD 26. A printed board 27, mounting CCD 26, is fixed to the bracket 25 by fastening bolts 28a and 28b into holes 25a and 25b formed on the bracket 25. The bracket 25 has an opening (or aperture) 25c at the center thereof so that CCD 26 is exposed from this opening 25c. In other words, the bracket 25 does not obstruct the field of view of CCD 26 directed toward the lens seat 22.

Furthermore, the bracket 25 has a pair of ligulate members 29 and 30 at opposed ends thereof. The ligulate members 29 and 30 have insertion holes 29a and 30a, respectively.

Figure 3A:
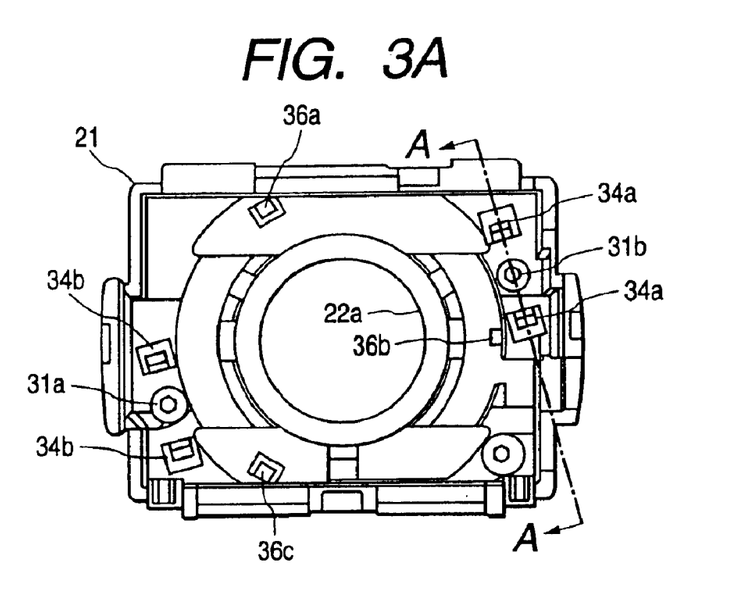
FIG. 3A is a rear view showing the back surface of an escutcheon of the video or image pickup apparatus in accordance with the preferred embodiment of the present invention.
Figure 3B:
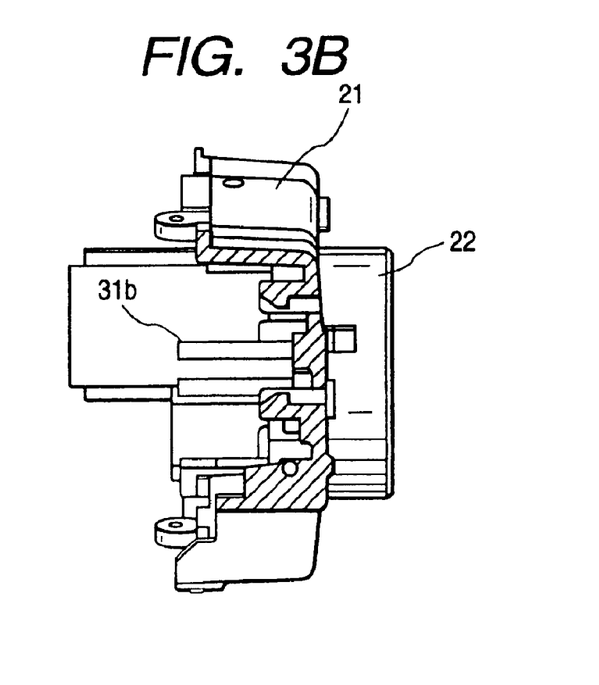
FIG. 3B is a cross-sectional view of the escutcheon taken along a line A—A of FIG. 3A.

The escutcheon 21 has a back surface from which a pair of rod members 31a and 31b protrude in the optic-axial direction, as shown in FIGS. 3A and 3B. The rod members 31a and 31b are located at predetermined positions so that the rod members 31a and 31b are inserted into the insertion holes 29a and 30a of the ligulate members 29 and 30. Thus, being guided by the rod members 31a and 31b, the bracket 25 can slide in the optic-axial direction.

Furthermore, the rod members 31a and 31b are arranged so as to penetrate or extend the inside space of coil springs 32a and 32b. The coil springs 32a and 32b are held in a compressed condition by pressing plate springs 33a and 33b. The pressing plate springs 33a and 33b have bifurcated legs engaged with corresponding separate holes 34a and 34b formed on the back surface of the escutcheon 21 as shown in FIGS. 3A and 3B. Thus, the pressing plate springs 33a and 33b resiliently urge the bracket 25 toward the focus adjusting ring 23.

On the other hand, three protrusions 35a~35c are formed on the outer cylindrical portion of the bracket 25. The protrusions 35a~35c protrude toward the focus adjusting ring 23. The protrusions 35a~35c can be brought into contact with the focus adjusting ring 23. According to this embodiment, the coil springs 32a and 32b and the pressing plate springs 33a and 33b cooperatively serve as a pressing member.

Three engaging protrusions 36a~36c are provided on the escutcheon 21 along the outer peripheral portion of the lens seat 22. The engaging protrusions 36a~36c can slide into the rail groove 24 via the notched portions 24a and are engaged with the rail groove 24.

Figure 4:
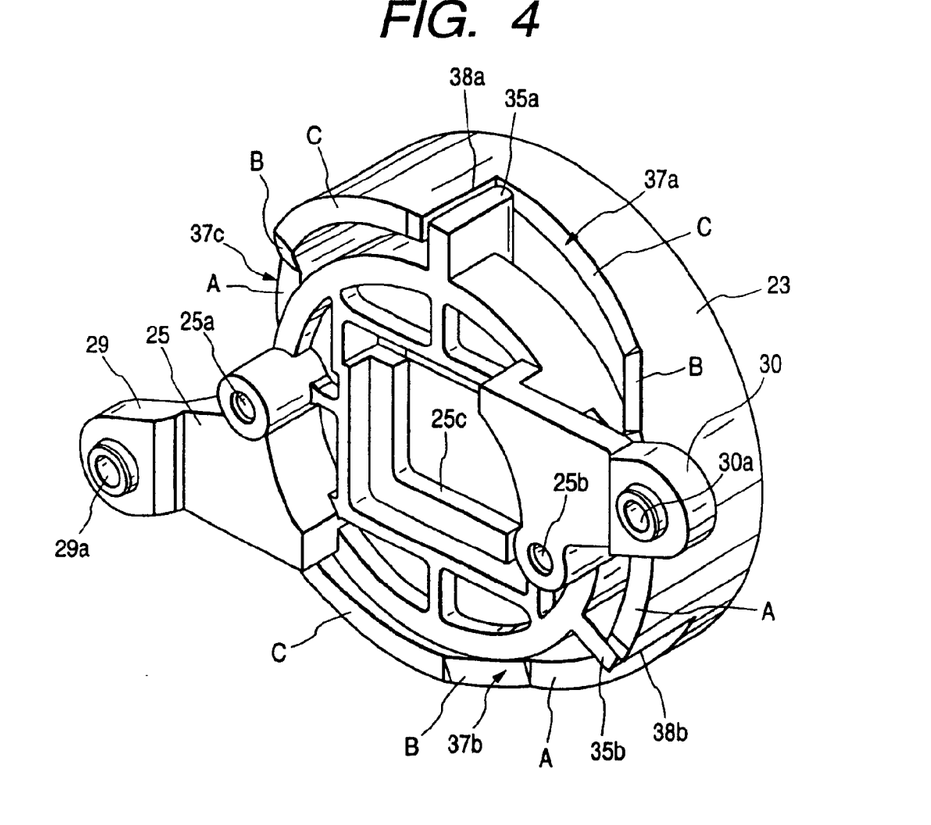
FIG. 4 is a perspective view showing engagement between a focus adjusting ring and a bracket in accordance with the preferred embodiment of the present invention.

The focus adjusting ring 23 has three cam surfaces 37a~37c on a surface opposing to the bracket 25. The cam surfaces 37a~37c can be brought into contact with the protrusions 35a~35c of the bracket 25.

Each of the cam surfaces 37a~37c has three kinds of slopes consisting of a deep slope A, an intermediate steep slope B, and a shallow slope C. When the focus adjusting ring 23 rotates, the protrusions 35a~35c of the bracket 25 are engaged with respective cam surfaces A, B and C. Thus, the rotational motion of the focus adjusting ring 23 is converted into a linear or progressive motion of the bracket 25. This mechanism makes it possible to change the optic-axial distance between the image pickup lens and CCD 26 so as to perform the focus adjustment.

Furthermore, the focus adjusting ring 23 has an inner cylindrical portion where three stoppers 38a~38c are formed. When the focus adjusting ring 23 rotates to a predetermined angular position, the focus adjusting ring 23 hits the stoppers 38a~38c against the protrusions 35a~35c of the bracket 25 so as to restrict the rotation of the focus adjusting ring 23 and prevent the notched portions 24a from meeting with the engaging protrusions 36a~36c. In FIG. 1, reference numeral 39 represents a cover plate fitted to the outside of the escutcheon 21.

Next, an assembling method for the video or image pickup apparatus will be explained.

First, the cover plate 39 is assembled to the escutcheon 21. Next, the focus adjusting ring 23 is overlapped with the lens seat 22 so that respective notched portions 24a agree in circumferential position with corresponding engaging protrusions 36a~36c. Then, by pushing and sliding the engaging protrusions 36a~36c into the rail groove 24 via the notched portions 24a, the focus adjusting ring 23 is securely fixed to the lens seat 22.

Next, the printed board 27 is fixed to the bracket 25 by fastening bolts 28a and 28b into holes 25a and 25b formed on the bracket 25. To assemble the bracket 25 to the escutcheon 21, the rod members 31a and 31b are inserted into the insertion holes 29a and 30a of the ligulate members 29 and 30. Then, the coil springs 32a and 32b are placed around the rod members 31a and 31b.

Next, the bifurcated legs of the pressing plate springs 33a and 33b are fixedly engaged into the corresponding separate holes 34a and 34b. Thus, the coil springs 32a and 32b are held in a compressed condition between the pressing plate springs 33a and 33b and the ligulate members 29 and 30. The coil springs 32a and 32b resiliently urge the bracket 25 toward the focus adjusting ring 23.

Next, a focus adjusting method for the above-described video or image pickup apparatus will be explained with reference to FIGS. 5 to 7.

Figure 5:
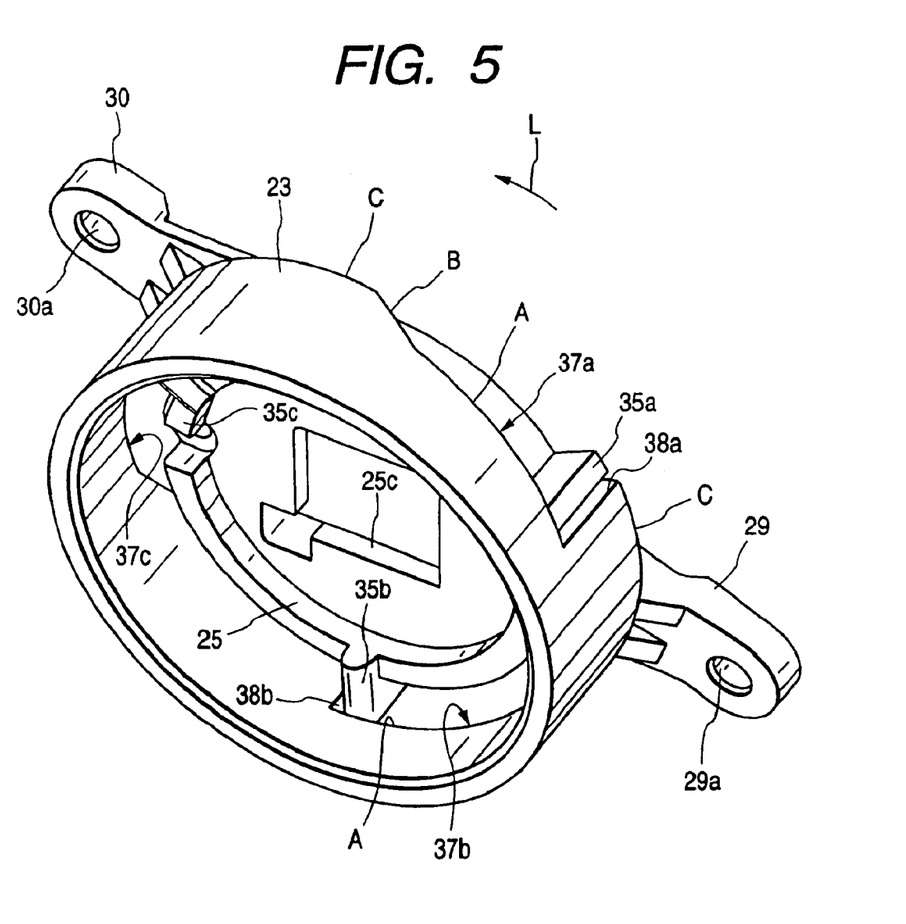
FIG. 5 is a perspective view showing engagement between protrusions of the bracket and deep cam slopes of the focus adjusting ring in accordance with the preferred embodiment of the present invention.

First, as shown in FIG. 5, the focus adjusting ring 23 rotates in the counterclockwise direction (i.e., in a direction indicated by an arrow L) until the focus adjusting ring 23 hits the stoppers 38a~38c against the protrusions 35a~35c. Rotation of the focus adjusting ring 23 is thus restricted, while the engaging protrusions 36a~36c are kept in the offset position spaced from the notched portions 24a. Therefore, the engaging protrusions 36a~36c are not disengaged from the rail groove 24. The focus adjusting ring 23 is thus surely engaged with the lens seat 22.

In this condition, the deep slope A of respective cam surfaces 37a~37c is brought into contact with the protrusions 35a~35c. The bracket 25, resiliently urged by the coil springs 32a and 32b, shifts toward the focus adjusting ring 23. Thus, CCD 26 approaches toward the image pickup lens supported by the lens seat 22.

Figure 6:
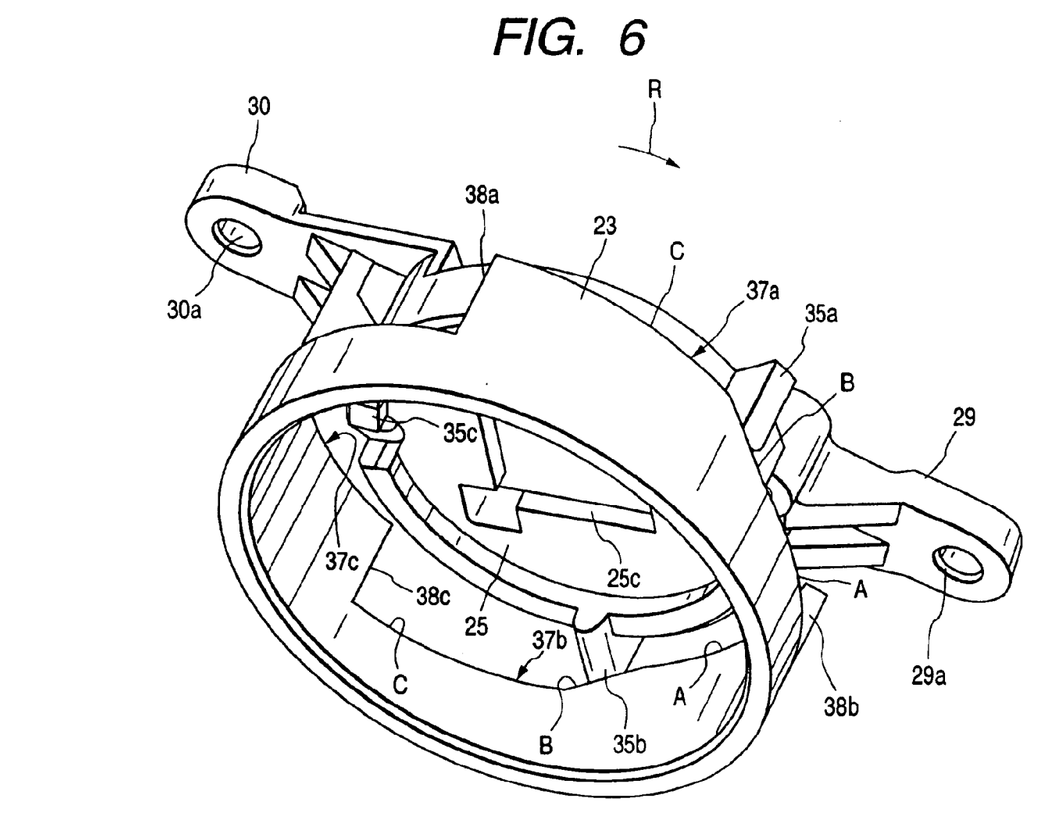
FIG. 6 is a perspective view showing engagement between the protrusions of the bracket and intermediate cam slopes of the focus adjusting ring in accordance with the preferred embodiment of the present invention.

Next, from the condition shown in FIG., 5, the focus adjusting ring 23 rotates in the clockwise direction (i.e., in a direction indicated by an arrow R shown in FIG. 6). The protrusions 35a–35c shift along the deep slope A and transfer to the intermediate steep slope B of respective cam surfaces 37a–37c. The bracket 25 departs from the focus adjusting ring 23 against the resilient force of the coil springs 32a and 32b. In other words, CCD 26 starts departing from the image pickup lens supported by the lens seat 22, thereby performing the focus adjustment.

Figure 7:
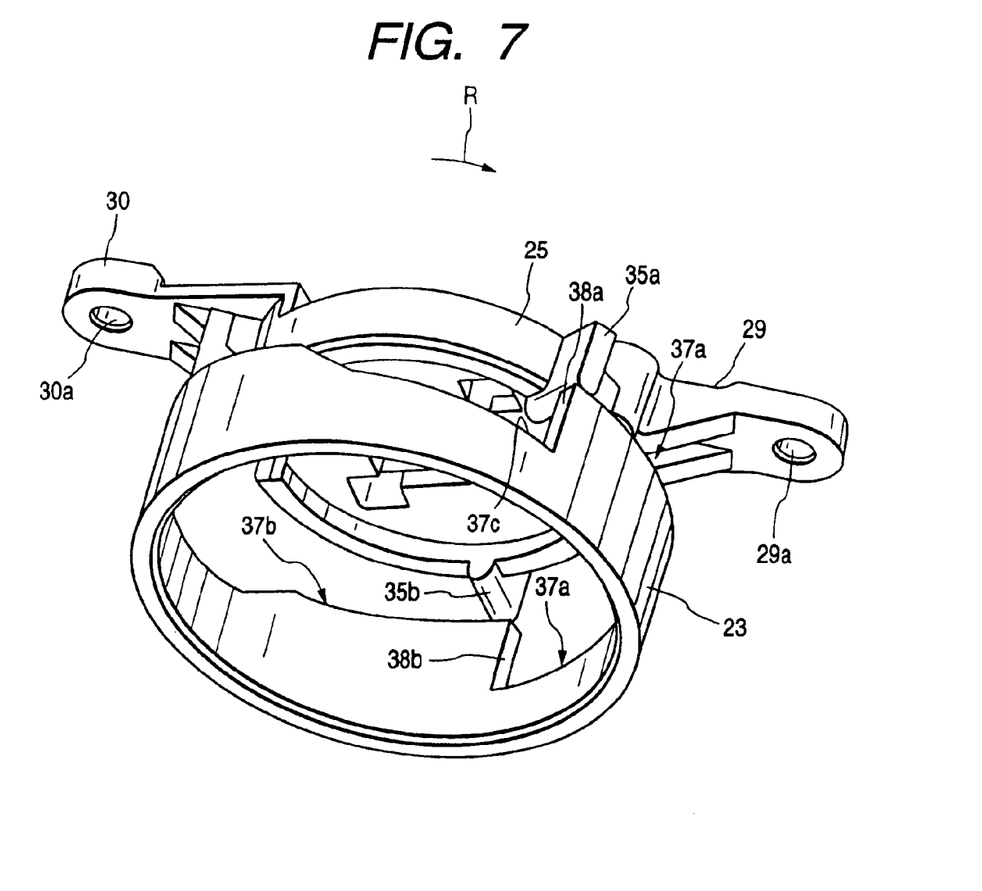
FIG. 7 is a perspective view showing engagement between the protrusions of the bracket and shallow cam slopes of the focus adjusting ring in accordance with the preferred embodiment of the present invention.

Next, the focus adjusting ring 23 is further rotated in the clockwise direction (i.e., in a direction indicated by an arrow R shown in FIG. 7). The protrusions 35a–35c shift along the intermediate steep slope B and transfer to the shallow slope C of respective cam surfaces 37a–37c. The bracket 25 further departs from the focus adjusting ring 23 against the resilient force of the coil springs 32a and 32b. In other words, CCD 26 further departs from the image pickup lens supported by the lens seat 22, thereby continuously performing the focus adjustment.

On the contrary, when the focus adjusting ring 23 rotates in the counterclockwise direction from the condition shown in FIG. 7, the protrusions 35a–35c shift along the shallow slope C, the intermediate steep slope B, and the deep slope A, successively. Thus, the bracket 25 shifts toward the focus adjusting ring 23 so that CCD 23 successively approaches toward the image pickup lens.

As described above, when the focus adjusting ring 23 rotates in the clockwise direction or the counterclockwise direction, the protrusions 35a–35c shift along the three kinds of continuous cam slopes, i.e., deep slope A, intermediate steep slope B, and shallow slope C. Accordingly, the rotational motion of the focus adjusting ring 23 is converted into a linear or progressive motion of the bracket 25. Thus, it becomes possible to change the optic-axial distance between the image pickup lens and CCD 26 so as to perform the focus adjustment.

As described above, according to the above-described embodiment of the present invention, the focus adjusting ring 23 can be easily assembled with the lens seat 22 by engaging the rail groove 24 provided on the outer cylindrical portion of the focus adjusting ring 23 with the engaging protrusions 36a–36c.

Furthermore, the cam surfaces 37a–37c of the focus adjusting ring 23 are brought into contact with the protrusions 35a–35c of the bracket 25 to cooperatively convert the rotational motion of the focus adjusting ring 23 into the linear or progressive motion of the bracket 25. Providing the cam surfaces 37a–37c on the inner cylindrical portion of the focus adjusting ring 23 opposing to the bracket 25 makes it possible to flexibly change the optic-axial distance between the image pickup lens and CCD 26 so as to surely perform the focus adjustment.

Furthermore, according to the above-described embodiment of the present invention, the pressing member is constituted by an assembly of the coil springs 32a and 32b and the pressing plate springs 33a and 33b. The coil springs 32a and 32b are placed around the rod member 31a and 31b provided on the back surface of the escutcheon 21. The pressing plate springs 33a and 33b are detachably engaged with the engaging holes 34a and 34b provided on the back surface of the escutcheon 21. The coil springs 32a and 32b, held in a compressed condition by the pressing plate springs 33a and 33b, resiliently urges the bracket 25. The pressing member of the present invention is therefore easily installed to the escutcheon 21.

Furthermore, a plurality of notched portions 24a are formed continuously with the rail groove 24 on the outer peripheral portion of the focus adjusting ring 23 at predetermined intervals. The engaging protrusions 36a–36c can slide into the rail groove 24 via the notched portions 24a and are engaged with the rail groove 24. The focus adjusting ring 23 has the inner cylindrical portion where a plurality of stoppers 38a–38c are formed. When the focus adjusting ring 23 is in a predetermined angular position, the focus adjusting ring 23 hits the stoppers 38a–38c against the protrusions 35a–35c of the bracket 25 so as to restrict the rotation of the focus adjusting ring 23 and prevent the notched portions 24a from meeting with the engaging protrusions 36a–36c.

Thus, the focus adjusting ring 23 can be easily assembled with the lens seat 22 by pushing and sliding the engaging protrusions 36a–36c into the rail groove 24 via the notched portions 24a. The stoppers 38a–38c surely hold the rail groove 24 into an engaged condition with the engaging protrusions 36a–36c. Thus, it becomes possible to prevent the rail groove 24 from being disengaged from the engaging protrusions 36a–36c. The focus adjusting ring 23 can be securely mounted on the lens seat 22.

What is claimed is:

1. A focus adjustment mechanism for a video or image pickup apparatus comprising:

a main frame comprising a front surface;

a focus adjusting ring rotatably engaged with an annular lens seat, said lens seat protruding forward from the front surface of said main frame for supporting an image pickup lens; said lens having an optic-axis;

an imaging element mount located inside said main frame opposite said focus adjusting ring for supporting an imaging element, said imaging element mount being shiftable along a direction of said optic-axis in response to rotational motion of said focus adjusting ring;

a pressing member for pressing said imaging element mount toward said focus adjusting ring;

a plurality of protrusions located on an outer cylindrical portion of said imaging element mount;

a rail groove located on an outer cylindrical portion of said focus adjusting ring, said rail groove extending along a circumference of said focus adjusting ring;

a plurality of engaging protrusions located on the front surface of said main frame around said lens seat and engaged with said rail groove of said focus adjusting ring;

cam means located on said focus adjusting ring opposite said imaging element mount and contact said protrusions located on said outer cylindrical portion of said imaging element mount, for increasing a distance between said imaging element mount and said focus adjusting ring against a pressing force of said pressing member when said focus adjusting ring rotates in one direction and for allowing said imaging element mount urged by the pressing force of said pressing member to approach said focus adjusting ring when said focus adjusting ring rotates in an opposite direction;

a plurality of notches located on the outer cylindrical portion of said focus adjusting ring at predetermined intervals along the circumference of the outer cylindrical portion and intersecting said rail groove;

said engaging protrusions for entering said rail groove via said notches and for engagement with said rail groove;

said focus adjusting ring comprising a stopper for abutting the protrusions of said imaging element mount so that rotation of said focus adjusting ring is restricted at a predetermined angular position when said focus adjusting ring rotates in said the opposite direction, and said engaging protrusions are angularly offset from said notches when said focus adjusting ring is held at said predetermined angular position.

2. The focus adjustment mechanism for a video or image pickup apparatus in accordance with claim 1, further comprising a rod member located on said main body, and at least one ligulate member protruding from the outer cylindrical portion of said imaging element mount, said ligulate member being slidable along the rod member when said imaging element mount slides, and said pressing member comprising at least one coil spring located around said rod member and at least one pressing plate spring detachably engaged with said main frame and holding said coil spring in a compressed condition wherein said coil spring is for resiliently urging said imaging element mount toward said focus adjusting ring.

* * * * *